July 25, 1933.  R. P. LANSING  1,920,086
PROPELLER
Filed Sept. 17, 1929   3 Sheets-Sheet 3
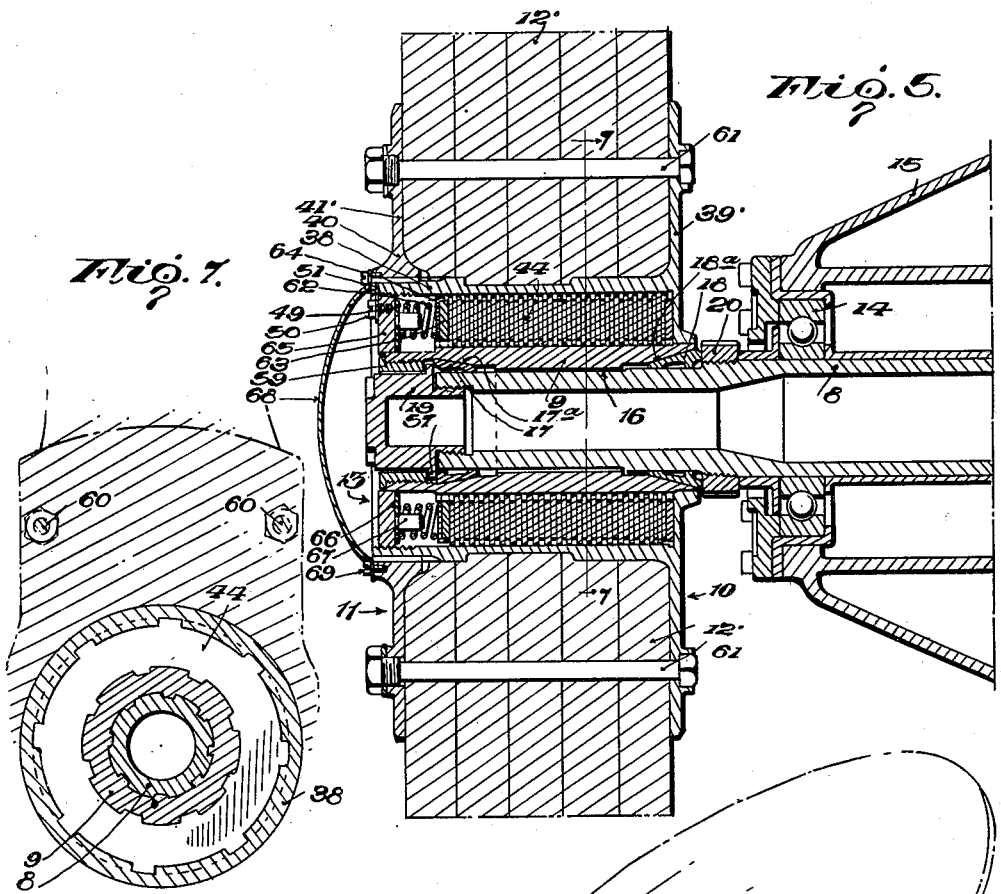
Fig. 5.
Fig. 7.
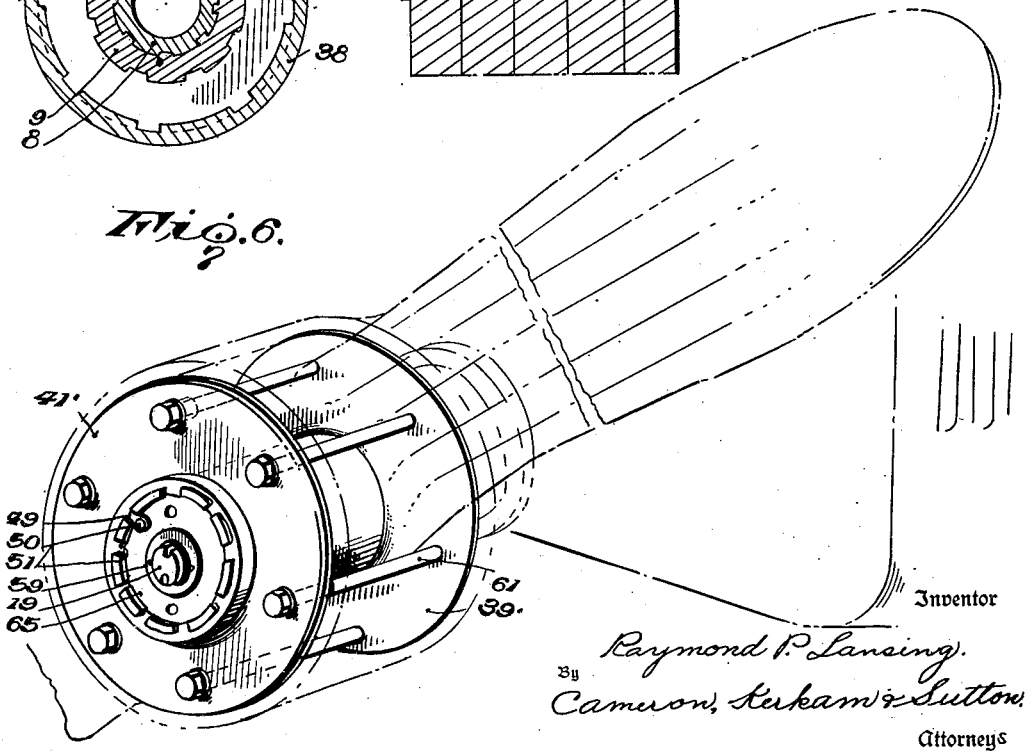
Fig. 6.
Inventor
Raymond P. Lansing.
By Cameron, Kerkam & Sutton.
Attorneys Patented July 25, 1933

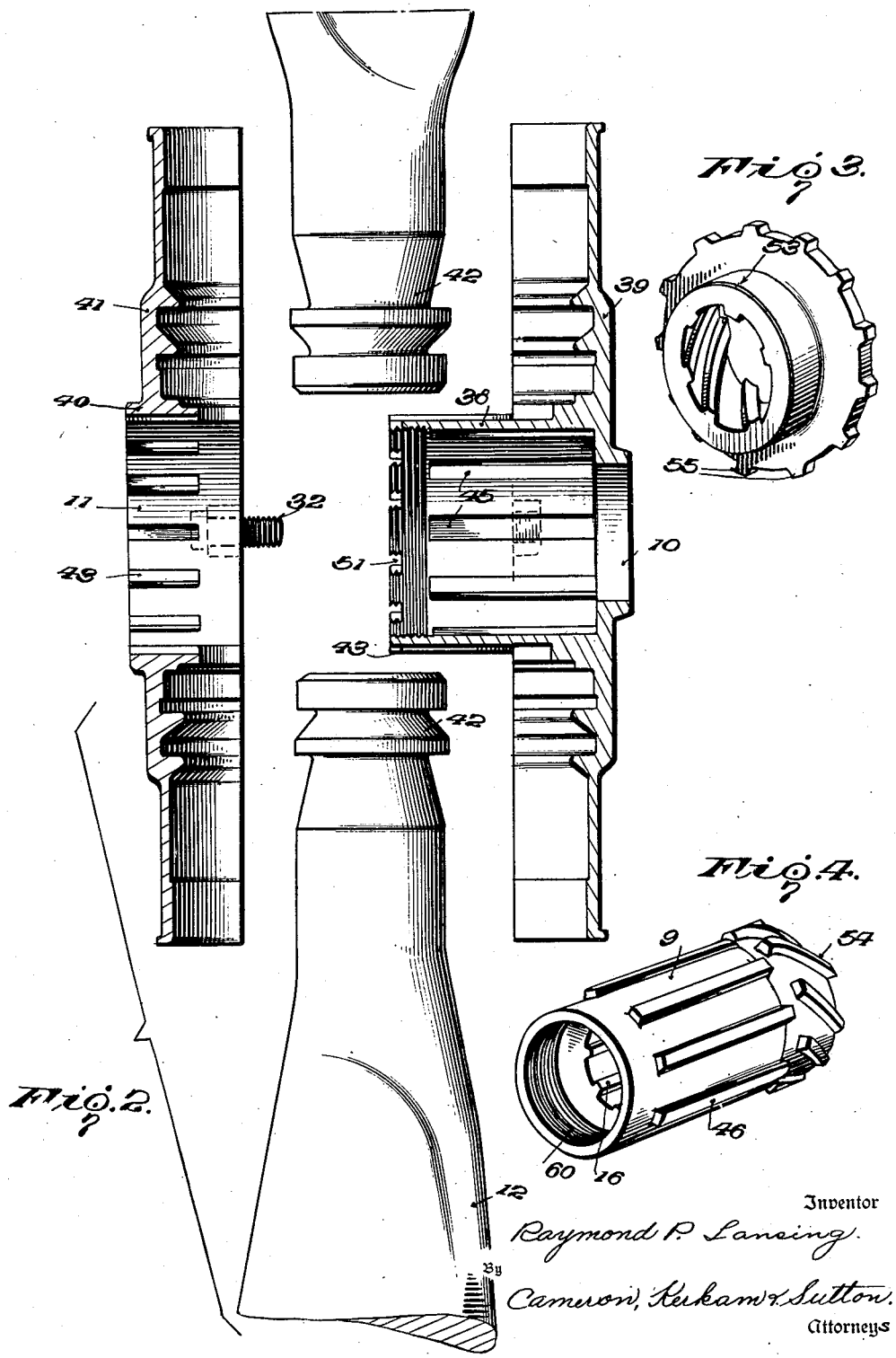

1,920,086

UNITED STATES PATENT OFFICE

RAYMOND P. LANSING, OF MONTCLAIR, NEW JERSEY, ASSIGNOR TO ECLIPSE AVIATION CORPORATION, OF EAST ORANGE, NEW JERSEY, A CORPORATION OF NEW JERSEY

PROPELLER

Application filed September 17, 1929. Serial No. 393,271.

This invention relates to rotary impellers, and more particularly to propellers for aircraft.

One of the most important factors affecting the smooth and efficient operation of an impeller which is directly connected or coupled to a source of rotation such as an internal combustion engine, is the stress set up in the blades of the impeller due to the impulses of torque which are received from the engine crankshaft. This type of stress is particularly objectionable in aircraft propellers since it causes a type of vibration known as blade warping, which vibration in turn is one of the serious factors in the failure of metal propellers.

Impellers which are directly connected or coupled to a source of rotation are also subjected to severe stresses due to the rapid acceleration or retardation of their speed of rotation upon the starting or stopping of the actuating device. These stresses also tend to induce failure of the blades.

One of the objects, therefore, of the present invention is to provide a novel impeller which will operate smoothly and efficiently, and in which the stresses incident to rotation, starting and stopping are reduced to a minimum.

Another object is to provide an impeller which embodies in its assembly novel means for smoothing out and reducing the objectionable, intermittent shocks received from the rotating shaft.

A further object is to provide a propeller embodying a yieldable connection between the blades thereof and the rotating shaft.

Still another object is to provide a novel propeller which is assembled from a number of separate parts, but which assembly is removable as a unit from the rotating shaft.

Two embodiments of the invention have been illustrated in the accompanying drawings both applied to propellers for aircraft, but it is to be expressly understood that the invention may be applied to other vehicles adapted for this type of propulsion, and that the drawings are for purposes of illustration only and are not to be construed as a definition of the limits of the invention, reference being had for this purpose to the appended claims.

In the drawings:

Fig. 2 is a separated vertical section showing the two parts of the hub of Fig. 1;

Fig. 3 is a perspective view of the clutch actuating nut of Fig. 1;

Fig. 4 is a perspective view of the sleeve of Fig. 1;

Fig. 5 is a vertical section of a wooden propeller assembly showing another embodiment of the prpesent invention;

Fig. 6 is a perspective view of Fig. 5 with the wooden blade and hub cap omitted; and Fig. 7 is a sectional view on line 7—7 of Fig. 5.

Figure 1:
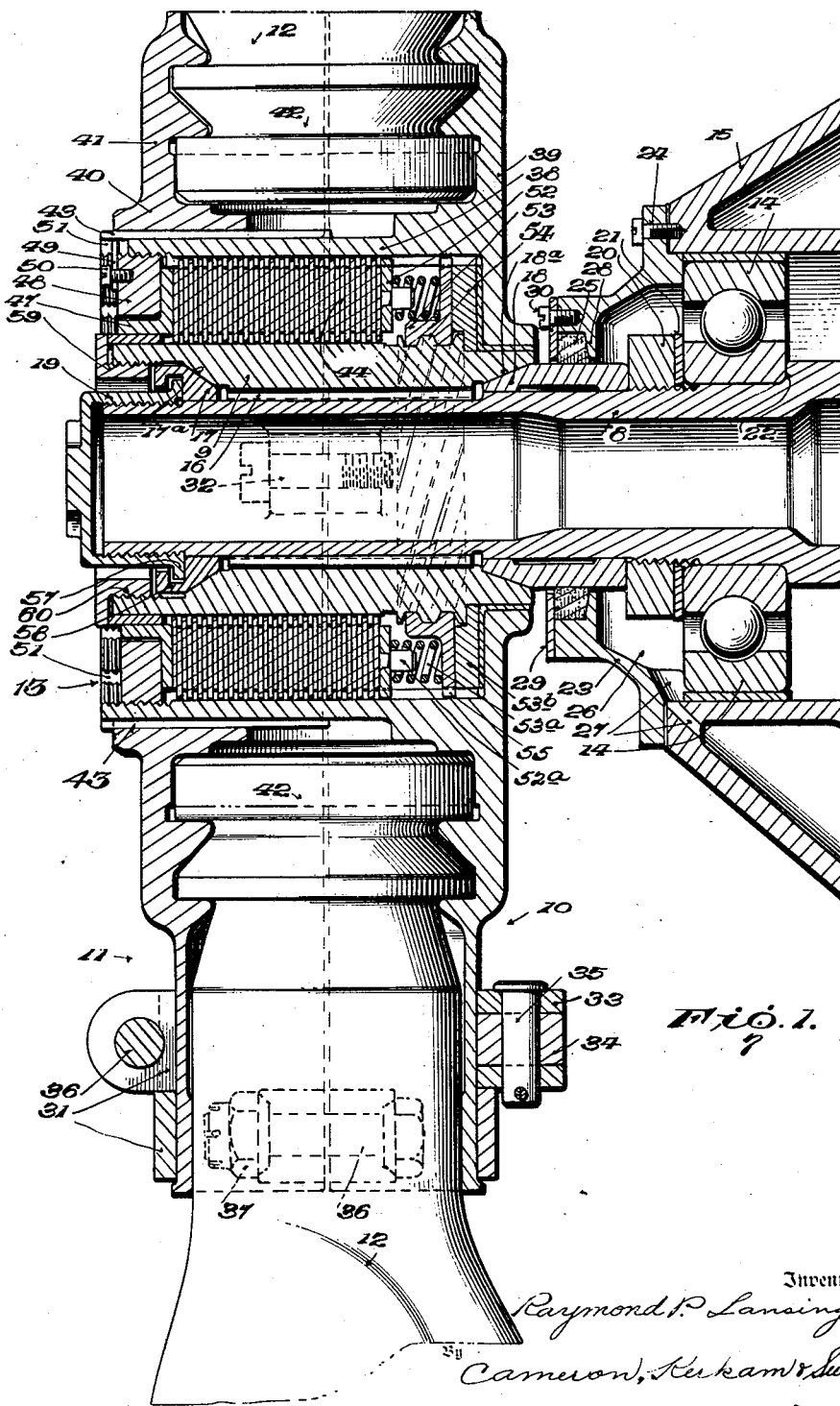
Fig. 1 is a vertical section of a metal propeller assembly showing one embodiment of the present invention.

Referring now to the drawings wherein like reference characters indicate like parts throughout the several views, Figs. 1–4 show a metal propeller assembly embodying novel means for smoothing out and reducing the objectionable, intermittent shocks received from the engine shaft. The propeller assembly comprises, in general, a propeller shaft 8 connected to or being an extension of the engine crankshaft (not shown), a sleeve 9, a hub comprising two coacting parts 10 and 11, propeller blades 12, and a yieldable connection between hub portion 10 and sleeve 9 indicated generally by 13.

The entire propeller assembly is built up on shaft 8 which is rotatably supported in any suitable manner as by means of a ball bearing 14 mounted in a support 15 which may be a portion of the engine casing or of the fuselage structure. Sleeve 9 is drivably secured to shaft 8 as by means of splines 16, and is held against longitudinal movement by a front cone 17 and a rear cone 18. These cones 17 and 18 are in turn given a driving fit with shaft 8 and sleeve 9 by means of a nut 19 threaded on and closing the outer end of shaft 8, and a thrust bearing nut 20 threaded on shaft 8 near ball bearing 14. These two nuts force cones 17 and 18 against beveled portions 17a and 18a of sleeve 9 and thereby allow adjustment in the usual manner to properly align the propeller. An annular washer 21 is also provided between thrust bearing nut 20 and ball bearing 14 in order to hold the latter in its proper position against a shoulder 22 formed on shaft 8.

An annular cover piece 23, enclosing thrust bearing nut 20 and ball bearing 14, is secured to support 15 in any suitable manner as by screws 24, and, with the provision of a felt packing ring 25 bearing on the outside surface of rear cone 18, forms an oiling space 26 to which oil may be fed through passage 27. Packing ring 25 is held in place by shoulder 28 of cover piece 23 and by an annular retaining plate 29 which is secured to cover piece 23 in any desired manner, as by means of screws 30.

The hub portion of the propeller assembly, as shown best in Fig. 2, preferably comprises two coacting, semicylindrical parts 10 and 11, which, when assembled, are held together as in Fig. 1 by means of two clamp rings 31 around each blade receiving portion of the hub and two screws 32. Each clamp ring is in two semicircular parts 33 and 34 hinged together as at 35, and clamped together by means of a bolt 36 and nut 37.

Part 10 of the hub is formed with a horizontal cylindrical portion 38, coaxial with shaft 8, integral with a vertical semicylindrical portion 39. Part 11 has a relatively short horizontal cylindrical portion 40, integral with a vertical semicylindrical portion 41, which portions are complementary to portions 38 and 39 of part 10. Portion 40 of part 11 slides over portion 38 of part 10 and is keyed thereto by means of splines 43. The outer surface of parts 39 and 41 is approximately cylindrical in shape, while the inner surface is formed with shoulders conforming to the shape of the blade root 42 of blade 12.

Yielding means are provided between the hub portion of the propeller and the sleeve 9, which will allow rotation of shaft 8 and sleeve 9 relative to the hub and blade assembly upon starting the engine and whenever torque exceeding a predetermined amount is transmitted by the shaft 8. Said yielding means preferably is in the form of a friction disk clutch indicated generally by 13, and comprises a plurality of interleaving annular disks 44 which are splined alternately to the interior of portion 38 of the hub assembly by means of grooves 45, and to the exterior of sleeve 9 by means of keys 46. The annular disks 44 are held against longitudinal movement toward the outer end of shaft 8 by means of an L-shaped annular ring 47, and the initial surface pressure between them is regulated by a nut 48 which threads into the interior of portion 38. Nut 48 may be locked in any desired position by means of a locking plate 49 which may be secured at one end to nut 48 as by a screw 50 and which at its other end engages one of a plurality of slots 51 which are cut into the periphery of part 38 at its outer end.

Means are also provided to hold disks 44 against longitudinal movement in the opposite direction and to vary the frictional pressure between said disks upon rotation of shaft 8. These means comprise a spacing ring 52 which is splined to portion 38 of the hub assembly, a nut 53 and coiled springs 53a interposed between said nut and spacing ring. These springs are maintained in spaced relationship around ring 52 by means of studs 52a. Nut 53 is screwed upon threaded portion 54 of sleeve 9 and in addition is provided with projections 55 which engage grooves 45 of portions 38 of the hub assembly, thus preventing rotation of nut 53 independently of the hub assembly. A distance ring 53b is provided against which nut 53 bears when shaft 8 is at rest. It will thus be seen that upon initial rotation of shaft 8 and sleeve 9, the surface pressure between disks 44 being insufficient to cause similar rotation of the hub assembly, nut 53 will advance outwardly increasing the surface pressure between disks 44, the sleeve 9 rotating through an arc of definite length, as predetermined by the normal spacing between the members 53 and 52, together with the pitch of the thread 54. With the pitch and the spacing shown, this arc would be considerably less than three hundred and sixty degrees, but with a different pitch and spacing, the arc might exceed three hundred and sixty degrees, and the word "arc" as used herein is to be so interpreted. This threading action continues until the clutch becomes effective to turn the hub assembly with the shaft and sleeve. With this construction the stresses which would ordinarily be set up in the blades due to the sudden acceleration of the crank shaft in starting are minimized, and the blades are accelerated smoothly. Also, after the shaft, sleeve and hub assembly are rotating together, any intermittent impulses of torque greater than a predetermined amount will cause the clutch to slip and prevent transmission of these impulses to the blades. Thus it is apparent that slippage of the clutch may occur under two distinct conditions, first, in response to the initial rotation of the sleeve 9 through an arc of predetermined length, and secondly at any time thereafter when the torque impulses exceed a predetermined amount.

Means are also provided in order to enable the entire assembly of sleeve, clutch, hub and blades to be removed as a unit from the shaft for inspection or repairs. In the embodiment shown, this means comprises the combination of an annular projecting lip 57 on nut 19 which fits into an annular groove 58 in the forward cone 17, with an annular nut 59 which threads into the interior of sleeve 9 as at 60. When, in an assembled propeller as shown in Fig. 1, nut 19 is unscrewed, lip 57 engages groove 58 in forward cone 17 and moves outward, the outer suface of cone 17 engages nut 59 and the entire assembly moves outward as a unit.

Another embodiment of the present invention is shown in Figs. 5–7 in combination with a wooden propeller. In this embodiment hub parts 39' and 41' have a uniformly smooth interior surface, the butts of the laminated wooden blades 12' being held within the hub portions by means of tie bolts 61. This embodiment also differs from Figs. 1–4 in that the pressure between clutch disks 44 is at all times regulated by means of a plurality of coil springs 62 which bear against a spacing ring 63 splined to the exterior of sleeve 9, and a plate 64 splined to the interior of portion 38 of the hub assembly. The pressure of springs 62 may be regulated by means of a nut 65 which is threaded into the interior of portion 38. Nut 65 may be locked in any desired position by locking plate 49 as before described. A ring 66 provided with studs 67 may be employed to maintain the coil springs 62 in spaced relation around the nut 65.

As shown in Fig. 5, the propeller may also be provided with a suitable hub cap 68 which may be secured to the assembly by any suitable means such as screws 69.

The present invention thus embodies a novel propeller which is provided with means for smoothing out and reducing to a minimum the shocks and stresses to which propeller blades are ordinarily subjected when the propeller assembly is directly connected to the source of rotation. By including in the propeller assembly a yieldable connection between the blades and the rotating shaft, the objectionable, intermittent stresses induced by starting and stopping, and by the impulses of torque due to cylinder explosions and misfires are greatly decreased thus insuring prolonged life of the propeller blades and smooth efficient operation. The present invention also provides a propeller which is assembled from a number of separate parts, but which is also so designed that the entire assembly may be removed from the shaft as a unit thus facilitating inspection and repairs.

What is claimed is:

1. In apparatus of the class described, the combination of a rotatable shaft, a plurality of blades, means for yieldably connecting said blades to said shaft, said means including a plurality of interleaving annular disks, concentric with said shaft and drivably connected alternately to said blades and said shaft, and means for causing said shaft to drivably rotate said blades only after said shaft has rotated through an arc of predetermined length.

2. In a propeller, the combination of a rotatable shaft, a plurality of blades and a friction disk clutch interposed between and drivably connecting said blades and said shaft, said clutch comprising a plurality of interleaving annular disks and means for varying the frictional pressure between the disks, said means being operable automatically upon rotation of said shaft.

3. In an impeller, the combination of a rotatable shaft, a sleeve drivably secured to said shaft, a plurality of blades having a common hub, means including a friction clutch for operatively connecting said hub and said sleeve, said friction clutch comprising a plurality of annular disks concentric with said shaft and means operable upon rotation of said shaft to exert a driving pressure on said disks.

4. A propeller comprising a rotatable shaft, a sleeve drivably connected to said shaft, a plurality of blades, a hub for said blades, means including a friction clutch for operatively connecting said hub and said sleeve, said clutch comprising a plurality of interleaving annular disks concentric with said shaft and splined alternately to said hub and said sleeve, and means for varying the frictional pressure between said annular disks, said means being operable manually, and also in accordance with the rotation of said shaft.

5. In apparatus of the class described, the combination of a shaft, a plurality of blades, a hub for said blades, means including a yieldable clutch for operatively connecting said hub to said shaft, and means for variably limiting the torque which can be transmitted by said shaft to said blades, said means including members located at either end of said clutch and independently movable along said shaft.

6. An impeller comprising a shaft, a blade having a hub, means including a friction clutch for operatively connecting said hub to said shaft, means for adjusting said clutch to limit the torque which can be transmitted therethrough from the shaft to the blade, and means operable only after a predetermined degree of rotation of said shaft to apply a driving torque to said clutch.

7. An impeller comprising a shaft, a sleeve drivably secured to said shaft, a plurality of blades having a hub, means including a friction clutch for operatively connecting said hub and said sleeve, and means for removing as a unit said blades, hub, sleeve and connecting means for said shaft.

8. In a propeller, the combination of a shaft, a sleeve, means including a wedge ring and splines on said sleeve for drivably securing said sleeve to said shaft, a plurality of blades, a hub, means for securing said blades to said hub, and means operatively connecting said hub and said sleeve including a friction clutch, said clutch comprising a plurality of annular disks splined alternately to said hub and said sleeve, and means for adjusting the frictional pressure between said annular disks.

9. In a propeller, the combination of a plurality of blades, a hub, means for securing said blades to said hub, a shaft internally threaded at its outer end, a sleeve internally threaded at its outer end, means for drivably securing said sleeve to said shaft including a shoulder on said sleeve and a nut screwing into the end of said shaft, means including a friction clutch for operatively connecting said hub and said sleeve, means for adjusting said clutch, and means including a nut screwing into said sleeve and a shoulder on the nut screwing into the shaft for removing as a unit from said shaft said blades, hub, sleeve and connecting means.

10. In a propeller, the combination of a plurality of blades, a hub, means for securing said blades to said hub, a shaft externally threaded at its outer end, a sleeve internally threaded at its outer end, a nut screwing onto the end of said shaft, means including a friction clutch for operatively connecting said hub and said sleeve, means for adjusting said clutch, and means including a nut screwing into said sleeve and a shoulder on the nut screwing onto the shaft for removing as a unit from said shaft said blades, hub, sleeve and connecting means.

11. In apparatus of the class described, the combination of a rotatable shaft, a plurality of blades, means for yieldably connecting said blades to said shaft, said means including a plurality of annular disks concentric with said shaft and drivably connected alternately to said blades and said shaft, and means for causing said shaft to drivably rotate said blades only after said shaft has rotated through an arc of predetermined length, said last named means comprising a member longitudinally movable toward said disks in response to rotation of said shaft.

12. An impeller comprising a shaft, a blade, a hub, means for connecting said blade to said hub, means including a friction clutch for operatively connecting said hub to said shaft, means for adjusting said clutch to limit the torque which can be transmitted therethrough from the shaft to the blade, and means operable upon rotation of said shaft to apply a driving torque to said clutch, said means comprising a member movable toward said clutch in response to rotation of said shaft.

13. An impeller comprising a shaft, a blade, a hub, means for connecting said blade to said hub, means including a friction clutch for operatively connecting said hub to said shaft, means for adjusting said clutch to limit the torque which can be transmitted therethrough from the shaft to the blade, and means operable upon rotation of said shaft to apply a driving torque to said clutch, said means comprising a threaded sleeve secured to said shaft, and a member threadedly engaging said sleeve and movable toward said clutch in response to rotation of said shaft and sleeve.

14. In a propeller, the combination of a plurality of blades, a hub, means for securing said blades to said hub, a shaft threaded at its outer end, a nut correspondingly threaded to engage the end of said shaft, means for operatively connecting said hub with said shaft, and means including a shoulder on said nut for removing as a unit from said shaft, said blades, hub and connecting means.

15. In a propeller, the combination of a plurality of blades, a hub, means for securing said blades to said hub, a shaft for driving said propeller, a sleeve secured to said shaft, means for operatively connecting said hub and said sleeve, and means including a member engageable with said shaft and a second member engageable with said sleeve for removing as a unit from said shaft, said blades, hub, sleeve and connecting means.

RAYMOND P. LANSING.